S. T. THORPE.
FISHING REEL OIL CAP PROTECTOR.
APPLICATION FILED AUG. 11, 1921.

1,405,729.

Patented Feb. 7, 1922.

Inventor
Samuel T. Thorpe
By Church & Church
His Attorneys

UNITED STATES PATENT OFFICE.

SAMUEL THOMAS THORPE, OF BRISTOL, CONNECTICUT.

FISHING-REEL OIL-CAP PROTECTOR.

1,405,729.　　　Specification of Letters Patent.　　Patented Feb. 7, 1922.

Application filed August 11, 1921. Serial No. 491,534.

*To all whom it may concern:*

Be it known that I, SAMUEL THOMAS THORPE, a citizen of the United States, residing at Bristol, in the county of Hartford and State of Connecticut, have invented certain new and useful Improvements in Fishing-Reel Oil-Cap Protectors; and I do hereby declare the following to be a full, clear, and exact description of the same, reference being had to the accompanying drawings, forming part of this specification.

This invention relates to a non-detachable cap for use with fishing reels and has for its principal object the provision of a simple and efficient dust cap that can be applied to the nonrotating disk forming the side wall of a fishing reel.

Fishing reels of the type as illustrated in the drawings are necessarily provided with some means for oiling the shaft of the reel since the latter is very delicately mounted and for efficiency in casting must be made to revolve with great ease. It has been the previous custom in reels of this type to extend each of the disks centrally to form a hollow boss which is perforated close to the disk and is threaded on its outer cylindrical surface to receive a solid threaded imperforate cup-shaped cap which can be bound against the disk so as to effectually protect the oil hole. There are but two objections to this type of dust cap, the first and least important being the amount of time that it requires to remove or unloosen the cap and the second being the danger of losing the cap entirely.

In the present invention the cap is not integral with the disk but is permanently secured to it so there is no possibility of loss of the cap, the latter being made to rotate on the hollow hub and having a small perforation adapted to register with the perforation in the hidden bearing cylinder, the location of the hidden oil hole being preferably designated by a radial scratch or mark on the outer surface of the disk. A small spring is provided to add the necessary friction between the hub and the cap, such spring being entirely free between the cap and hub but constantly exerting pressure in an axial direction.

In the drawings,—

Figure 1:
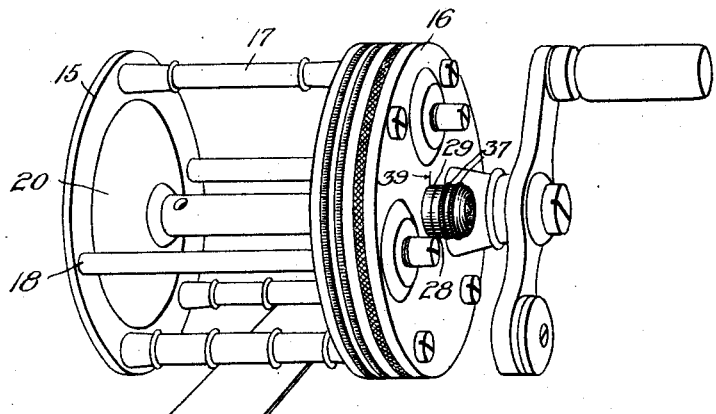
Figure 1 is a diagrammatic view of a Meek reel embodying the present invention.

The two stationary disks 15 and 16 are secured together by the cross rods 17 and the spacer rods 18 and support between them the reel 20 which, as is customary in this art, has an integral extended shaft on either end projecting into the hollow hub portions 22 of each of the disks.

The bearing opening 23 in the hub 22 is cylindrical throughout the greater part of its length and conical at its extreme end 24. Access to the opening 23 is obtained by means of the oil orifice 25 located at the extreme end of the cylindrical portion of the bearing opening. The hub 22 at its end is provided with an annular V-shaped groove forming a central cone 26 and a marginal portion 27, the latter adapted to be spun over to hold in place the rotating dust cap 28.

An annular flange 29 surrounds the hub 24 forming a channel 30 adapted to receive a helical spring 31, preferably of a single coil, when the latter is compressed axially by the flange 32 of the dust cap 28 which flange is adapted to fit snugly into the channel 30 but is not of sufficient depth to touch the base of such channel but leaves sufficient room so that the shoulder 33 may fit snugly against the edge of the flange 29 after compressing the spring 31 into the channel 30.

Figure 2:
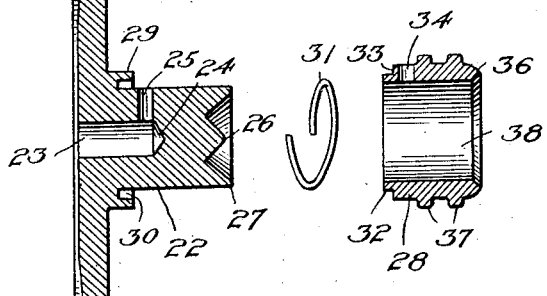
Fig. 2 is a vertical sectional view through the disk, hub, and cap before assembly.
Figure 3:
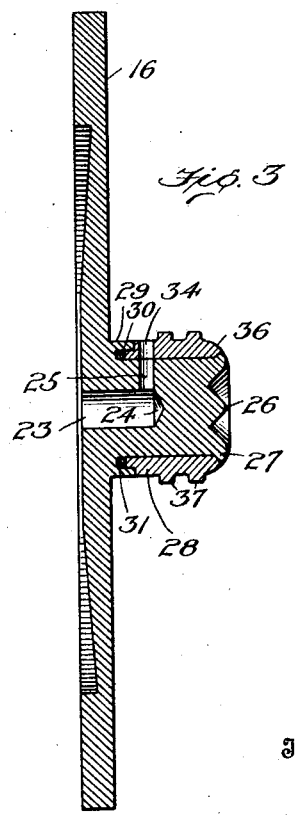
Fig. 3 is a similar view of the parts shown in Fig. 2 when in assembled position.

As best seen in Fig. 2 the dust cap is a sleeve of metal having an oil orifice 34 adapted to register with the orifice 25 and has a rounded upper edge 36 and is provided with one or more annular knurled portions 37 to facilitate rotating the dust cap abount the outer cylindrical surface of the hub 22 which accurately fits within the central opening or bore 38 of the dust cap.

To assemble the dust cap on the bearing, the spring 38 is first slipped over the hub 22 loosely embracing the same, and the dust cap 28 is then placed on the hub compressing the spring and forcing it into the channel 30 which is closed by the flange 32 when the dust cap is pressed down to the limit of its movement.

When the parts are in this position the upper edge 27 of the hub is then spun down over the cap 28 so as to effectually prevent axial movement of the cap in an outward direction, movement in the opposite direction being prevented by the engagement of the shoulder 33 with the annular flange 29. While the cap is free to rotate about the hub 22 the spring 31 offers a constant resistance to such movement and consequently resiliently holds the cap in whatever position to which it is turned.

It is preferable to scratch or engrave a mark such as 39 on the face of the disk extending radially from the oil orifice 25 so that in order to oil the bearings of the reel it is merely necessary to turn the cap so that its visible oil orifice 38 is in line with the radial mark 39 at which time the two oil holes will be in registry.

What I claim is:

In a fishing reel, a rotating member having a trunnion, a bearing for said trunnion having an oil orifice therein, an annular flange surrounding a portion of said bearing and providing an annular groove, a spring in said groove, a dust cap having an oil orifice and rotatably mounted on said bearing, an annular flange thereon extending into said annular groove and pressing against said spring, and means carried by said bearing for preventing withdrawal of said cap while permitting rotation thereof against the resistance offered by said spring.

SAMUEL THOMAS THORPE.